US012789523B2

(12) United States Patent
Daniels et al.

(10) Patent No.: US 12,789,523 B2
(45) Date of Patent: Nov. 10, 2026

(54) METHOD TO REDUCE SATELLITES WHEN USING MULTI-EJECTION WAVEFORMS

(71) Applicant: Xerox Corporation, Norwalk, CT (US)

(72) Inventors: Brian J. Daniels, Lake Oswego, OR (US); Brian E. Williams, Blanchard, ID (US)

(73) Assignee: Xerox Corporation, Norwalk, CT (US)

( * ) Notice: Subject to any disclaimer, the term of this patent is extended or adjusted under 35 U.S.C. 154(b) by 355 days.

(21) Appl. No.: 18/406,649

(22) Filed: Jan. 8, 2024

(65) Prior Publication Data

US 2025/0222691 A1 Jul. 10, 2025

(51) Int. Cl.
*B41J 2/045* (2006.01)
*B41J 13/08* (2006.01)

(52) U.S. Cl.
CPC ....... *B41J 2/04516* (2013.01); *B41J 2/04551* (2013.01); *B41J 2/0458* (2013.01); *B41J 2/04581* (2013.01); *B41J 2/04588* (2013.01); *B41J 13/08* (2013.01)

(58) Field of Classification Search
CPC .. B41J 2/04516; B41J 2/04551; B41J 2/0458; B41J 2/04581; B41J 2/04588; B41J 13/08
See application file for complete search history.

(56) References Cited

U.S. PATENT DOCUMENTS 7,108,354 B2 9/2006 Gulvin et al.
9,174,440 B2 11/2015 Kladias et al.
9,586,420 B2 * 3/2017 Sato .......................... B41J 11/36
10,999,449 B1 * 5/2021 Praharaj ............... H04N 1/2323
2006/0001685 A1 1/2006 Freire
2013/0076817 A1 * 3/2013 Olson ..................... B41J 2/2054 347/12
2018/0065360 A1 3/2018 Seto et al.

FOREIGN PATENT DOCUMENTS

JP 2012045797 A * 3/2012

OTHER PUBLICATIONS

English machine translation of Tsukamoto (JP 2012045797 A) (Year: 2012).*

* cited by examiner

*Primary Examiner* — Ricardo I Magallanes
*Assistant Examiner* — Natasha Dephenia Quinn
(74) *Attorney, Agent, or Firm* — Caesar Rivise, PC

(57) ABSTRACT

An automated system and method to reduce satellites when using multi-ejection waveforms by ejecting single, fewer, and/or different sized ejection drops at the trailing edge of text and lines modifies ejection waveforms to minimize droplet satellites. The system includes a printer that may eject single, fewer, and/or different sized ejection drops at the trailing edge of text and lines to reduce the satellites trailing from these features. The approach can be used in both a binary printing mode (e.g., single drop size per pixel) and a greyscale printing mode (e.g., multiple drop sizes per pixel). Further, the printer may be a 2D or 3D printer within the inkjet technology.

20 Claims, 7 Drawing Sheets

$$La\sqrt{\frac{d}{py^{3}}}\,n^{2}v$$

$L$ = ligament length
$d$ = nozzle diameter
$p$ = density
$y$ = surface tension
$n$ = viscosity
$v$ = fluid velocity

METHOD TO REDUCE SATELLITES WHEN USING MULTI-EJECTION WAVEFORMS

FIELD OF DISCLOSURE

This invention relates generally to devices and methods that produce ink images on media, and more particularly, to modifying printhead ejections to minimize ink droplet satellites during printing.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan (C), magenta (M), yellow (Y), and black (K). The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Image quality in inkjet printers depends upon on many factors such as ink chemistry, printhead technology, thermals in the vicinity of the ink drops, print process setpoints, airflows, and ink-to-media spreading and drying interactions. One issue that degrades image quality is the separation of the ink drops during the flight time from the inkjet nozzles to the ink receiving surface. When the ink drop is first ejected from a nozzle it is elongated and during the flight of the ink drop, the lead end and the tail end of the drop merge to form a coherent drop. Sometimes, however, the elongated portions of the drop separate from the leading end of the drop and produce satellite drops. These satellite drops (also referred to herein as "satellites") tend to land outside of the landing area for the major portion of the ink drop that cohered before landing, and may be objectionable from an image quality perspective.

Satellite drops from multiple-ejection drops may be even more objectionable from an image quality perspective. Ink drops from multiple ejection waveforms may have more satellites than drops from single (or fewer) ejection waveforms. Typically image quality drives towards using larger volume drops (higher number of ejections) in text and lines to make them more bold. This can cause issues with satellite drops at the trailing edges of text and lines. It would be beneficial to minimize satellites, especially at such trailing edges of text and lines.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a method to reduce satellites when printing from a printer using multi-ejection waveforms, with the printer including a printhead having a plurality of inkjets, a media transport and a controller. The method includes the features of moving a media sheet relative to the printhead in a process direction via the media transport so that an ink image printed on the media sheet has a leading edge and trailing edge, analyzing ink image content data via the controller to identify ink image features in the ink image content data that are to be printed at the leading edge and the trailing edge of the ink image to be printed on the media sheet in the process direction, selecting the inkjets via the controller to print the ink image content data onto the media sheet in the process direction, and operating the selected inkjets via the controller to print portions of the ink image features at the leading edge and the trailing edge of the ink image that corresponds to the ink image content data with the trailing edge having smaller and/or fewer ink drops than the leading edge.

While not being limited to a particular theory, the controller may modify an ejection waveform between the leading edge and the trailing edge of the ink image so that the inkjets eject fewer drops of ink at the trailing edge than at the leading edge. In examples, the controller may generate firing signals for operating the selected inkjets via a plurality of full length waveforms, a particular first waveform having a first voltage to drive the selected inkjets at the leading edge of the ink image, and a particular second waveform having a second voltage lower than the first voltage to drive the selected inkjets at the trailing edge of the ink image. In certain examples, the controller may generate firing signals for operating the selected inkjets via a plurality of full length waveforms, a particular first waveform having a first waveform frequency to drive the selected inkjets at the leading edge of the ink image, and a particular second waveform having a second waveform frequency lower than the first waveform frequency of the particular first waveform to drive the selected inkjets at the trailing edge of the ink image. The waveforms may be full length waveforms.

In addition, the controller may generate firing signals for operating the selected inkjets to emit drops with a first number of ejections at the leading edge of the ink image, and to emit drops with a second number of ejections less than the first number of ejections at the trailing edge of the ink image. Further, the controller may generate firing signals for operating the selected inkjets to print the ink image via the inkjets emitting multiple-ejection drops, with the inkjets emitting first volume drops via a first number of ejections per drop, and second volume drops via a second number of ejections per drop, the second number of ejections per drop being less than the first number of ejections per drop resulting in the second volume drops being smaller in volume than the first volume drops. The inkjet printer may be a 2D printer or a 3D printer and may print the ink image in at least one of a binary printing mode and a grayscale printing mode.

According to aspects illustrated herein, an exemplary printer includes a printhead having a plurality of inkjets, a media transport for moving a media sheet relative to the printhead in a process direction so that an ink image printed on the media sheet has a leading edge and trailing edge, and a controller operatively connected to the printhead. The controller is configured to analyze ink image content data to identify ink image features in the ink image content data that are to be printed at the leading edge and the trailing edge of the ink image to be printed on the media sheet in the process direction, select the inkjets to print the ink image content data onto the media sheet in the process direction, and operate the selected inkjets to print portions of the ink image features at the leading edge and the trailing edge of the ink image that corresponds to the ink image content data with the trailing edge having smaller and/or fewer ink drops than the leading edge.

According to aspects described herein, an exemplary non-transitory computer readable medium stores instructions that, when executed by a processor, cause the processor to execute a method to reduce satellites when printing from a printer using multi-ejection waveforms, with the printer including a printhead having a plurality of inkjets, a media transport and a controller. The method executed by the processor includes moving a media sheet relative to the printhead in a process direction via the media transport so that an ink image printed on the media sheet has a leading edge and trailing edge, analyzing ink image content data via the controller to identify ink image features in the ink image content data that are to be printed at the leading edge and the trailing edge of the ink image to be printed on the media sheet in the process direction, selecting the inkjets via the controller to print the ink image content data onto the media sheet in the process direction, and operating the selected inkjets via the controller to print portions of the ink image features at the leading edge and the trailing edge of the ink image that corresponds to the ink image content data with the trailing edge having smaller and/or fewer ink drops than the leading edge.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
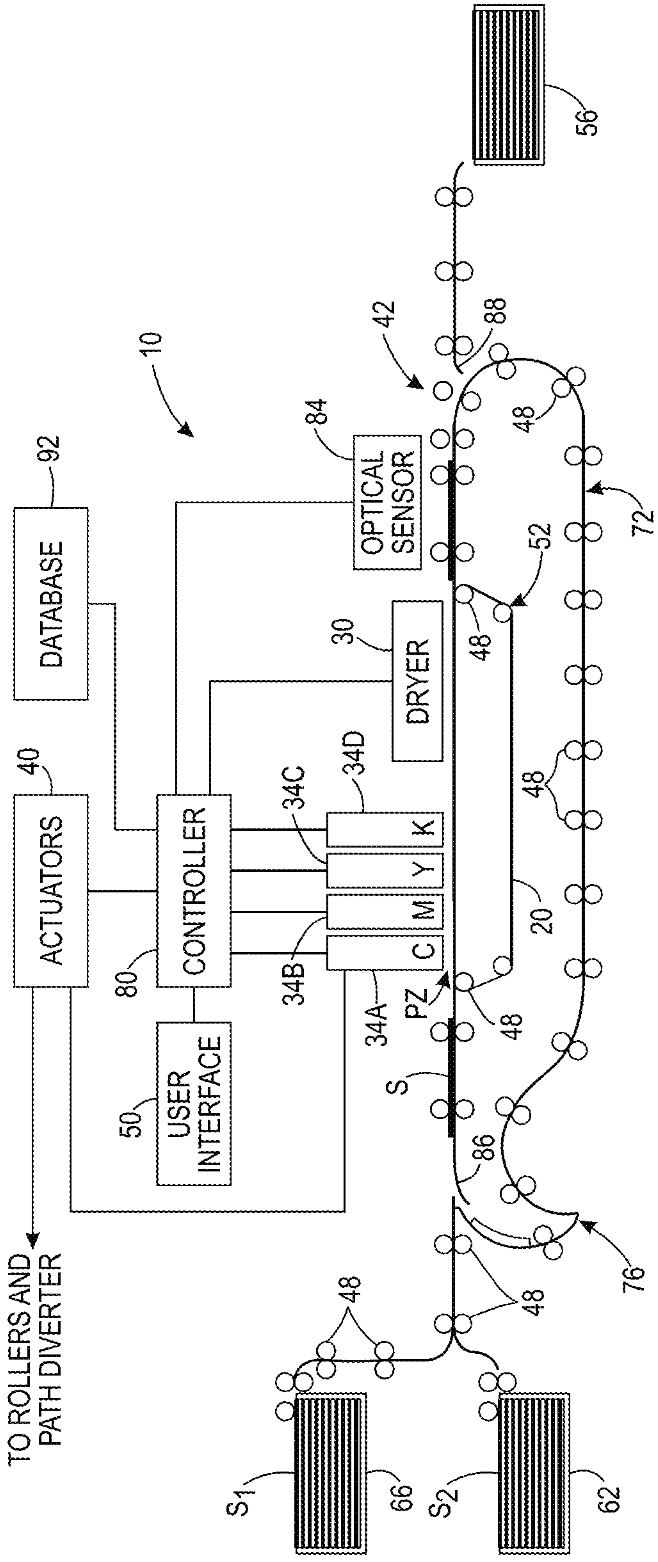
FIG. 1 is a schematic drawing depicting an exemplary variable data color inkjet printer configured to select inkjets for ejecting ink drops at the trailing edges, leading edges, and central portions of ink images in accordance with examples of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatuses, and systems for automatically collecting, collating and transporting media strips (e.g. retail edge marker strips) destined for in-store shelves.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The terms "media", "media sheet", "web", "web substrate", "print substrate" and "substrate sheet" generally refers to a usually flexible physical sheet of paper, polymer, Mylar material, plastic, or other suitable physical print media substrate, sheets, webs, etc., for images, whether precut or web fed. The listed terms "media", "print media", "print substrate" and "print sheet" may also include woven fabrics, non-woven fabrics, metal films, carbon fiber reinforced material and foils, as readily understood by a skilled artisan.

The term 'printing system", "printing device" or "printer" as used herein encompasses any apparatus that performs a print outputting function for any purpose, such as a digital copier, scanner, image printing machine, xerographic device, digital production press, document processing system, image reproduction machine, bookmaking machine, facsimile machine, multi-function machine, 3D printer or the like and can include several marking engines, feed mechanism, scanning assembly as well as other print media processing units, such as paper feeders, finishers, and the like. A printing system can handle sheets, webs, marking materials, 3D feedstock and the like. A 3D printer can make a 3D object, and the like. A 3D printer may also be used to manufacture 2D, sheet-like, or surface-like objects. It will be understood that the structures depicted in the figures may include additional features not depicted for simplicity, while depicted structures may be removed or modified.

The term "controller" or "control system" is used herein generally to describe various apparatus such as a computing device relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures.

When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

Although embodiments of the invention are not limited in this regard, discussions utilizing terms such as, for example, "processing," "computing," "calculating," "determining," "using," "establishing", "analyzing", "checking", or the like, may refer to operation(s) and/or process(es) of a controller, computer, computing platform, computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The printer and method described below operate inkjets for ejecting ink drops at the leading edges and trailing edges of ink images to be printed at different ejection output volumes, with the trailing edges having less ink ejection volume (e.g., by size, number of ejections, ejections per drop, number of drops, waveform frequency, waveform voltage) than the leading edges. Specifically, the printer and method may minimize satellites on the trailing edge of text, lines and regions by using a drop with fewer ejections at that trailing edge. In examples, the printer and method use single, fewer, and/or different sized ejection drops at the trailing edge of text and lines to reduce the satellites. The approach can be used in both a binary printing mode (e.g., single drop size per pixel) and a greyscale printing mode (e.g., multiple drop sizes per pixel). Further, the printer may be a 2D or 3D printer within the inkjet technology. This disclosure will use the term ink to refer to a broad range of printing or marking materials to include those which are commonly understood to be inks, pigments, and other liquid materials which may be applied by an exemplary ink jet printer to produce an output image on an image receiving media sheet.

FIG. 1 depicts a high-speed color inkjet printer 10 that is configured to select inkjets for ejecting ink drops at the trailing edges, leading edges, and side edges that are less likely to be affected by airflow disturbances at those portions of the media sheets. As illustrated, the printer 10 is a printer that directly forms ink images on a surface of a media sheet stripped from one of the supplies of media sheets S1 or S2 and the sheets S are moved through the printer 10 by a controller 80 operating one or more actuators 40 that are operatively connected to rollers 48 or to at least one driving roller of conveyor 52 that includes a portion of a media transport 42 that passes through a print zone PZ of the printer. It is understood that the inkjet printer 10 is shown as a cut-sheet type printer. The printer 10 may also be a roll-feed type printer that may include a cutter (not shown) that cuts the media into sheets S as readily understood by a skilled artisan.

In examples, the printer includes printhead modules 34, with each printhead module having a printhead that has a width that corresponds to a width of the widest media in the cross-process direction that can be printed by the printer. In other examples, the printhead modules 34 may have a plurality of printheads 204 (FIG. 2) with each printhead having a width that is less than a width of the widest media in the cross-process direction that the printer can print. In these modules 34, the printheads 204 each may include at least one inkjet nozzle and may be arranged in an array of staggered printheads that enables media wider than a single printhead to be printed. Additionally, printheads within a module or between modules may also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

The media transport 42 includes a belt 20 for moving print media, such as paper sheets, envelopes, substrates or any other article suitable for receiving printed images through the print zone PZ so the printheads 204 can eject ink drops onto the moving media to form printed images on the media. In some examples the belt 20 may have apertures through portions thereof, the belt moves over a vacuum plenum within the conveyor 52, and a suction force can be generated through the surface of the belt. The print media engages a portion of the holes on the surface of the belt 20 and the suction force holds the print media to the surface of the belt to prevent the print media from slipping or otherwise moving relative to the surface of the belt as the belt moves through the printer. Holding each print media in place relative to the surface of the moving belt enables the printer to control the timing of the operation of printheads 204 to ensure that the printheads form printed images in desired locations on each print media and helps to ensure that the print media does not cause jams or other mechanical issues with the printer. In large-scale printer configurations, the belt may carry multiple print media simultaneously.

Figure 2:
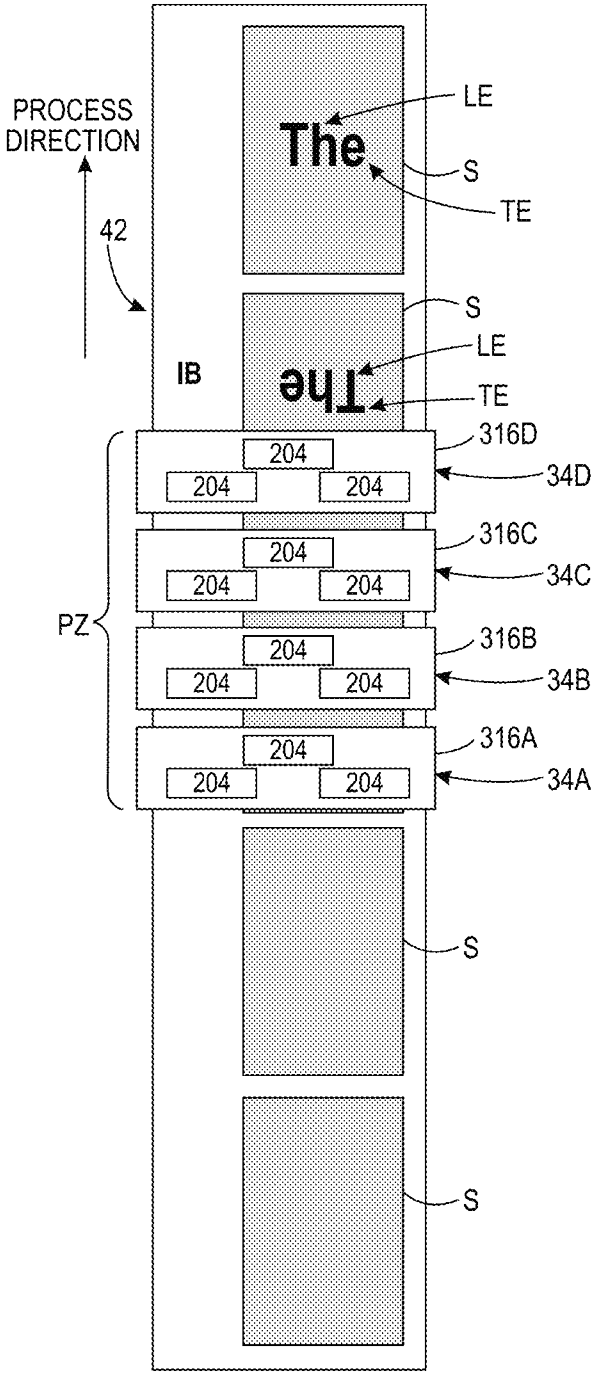
FIG. 2 depicts the print zone in the printer of FIG. 1.

The print zone PZ in the printer 10 of FIG. 1 is also depicted in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 includes three printheads 204 mounted to one of the printhead carrier plates 316A, 316B, 316C, and 316D, respectively. The legend IB represents the inboard edges of media sheets passing through the print zone. The legends LE and TE represent, respectively, the leading edge, and the trailing edge of ink images on the media sheets passing through the print zone. Ink images may include an image, a non-contiguous portion of an image, a letter, number, symbol, word or combinations thereof.

With continued reference to FIG. 1, printed images pass under an image dryer 30 after the ink images are printed on a sheet S. The image dryer 30 can include an infrared heater, a heated air blower, air returns, or combinations of these components to heat the ink images and at least partially fix print images to the sheet. An infrared heater applies infrared heat to the printed images on the surface of the sheet to evaporate water or solvent in the ink. The heated air blower directs heated air using a fan or other pressurized source of air over the ink to supplement the evaporation of the water or solvent from the ink. The air is then collected and evacuated by air returns to reduce interference of the dryer air flow with other components in the printer.

The media transport 42 also includes a duplex path 72 that can turn a sheet over and return it to the media transport prior to the printhead modules so the opposite side of the sheet can be printed. The duplex path 72 may be provided to receive a sheet from the media transport 42 after a substrate has been printed on and move it by the rotation of rollers 48 in an opposite direction to the direction of movement past the printheads 204. At position 76 in the duplex path 72, the substrate can be turned over so it can merge into the job stream being carried by the media transport 42. The controller 80 is configured to flip the substrate sheet selectively. That is, the controller 80 can operate actuators to turn the sheet over so the reverse side of the sheet can be printed or it can operate actuators so the sheet is returned to the transport path without turning over the sheet so the printed side of the sheet can be printed again.

Movement of pivoting member 88 provides access to the duplex path 72. Rotation of pivoting member 88 is controlled by controller 80 selectively operating an actuator 40 operatively connected to the pivoting member 88. When pivoting member 88 is rotated clockwise as shown in FIG. 1, a gap between the pivoting member 88 and the duplex path 72, and a substrate from media transport 42 is diverted to the duplex path. Rotating the pivoting member 88 in the counterclockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to detect streakiness in the printed images on the media sheets of a print job. Additionally, sheets that are printed with test pattern images may be inserted at intervals during the print job. These test pattern images are analyzed by the controller 80 to determine which inkjet printheads 204, if any, that were operated to eject ink into the test pattern did in fact do so, and if an inkjet printhead did eject an ink drop whether the drop landed at its intended position with an appropriate mass. Any inkjet printhead not ejecting an ink drop it was supposed to eject or ejecting a drop not having the right mass or landing at an errant position is called an inoperative inkjet printhead in this document.

The controller can store data identifying the inoperative inkjets (e.g., inkjet printheads 204) in database 92 operatively connected to the controller. These sheets printed with the test patterns are sometimes called run-time missing inkjet (RTMJ) sheets and these sheets may be discarded from the output of the print job. A user can operate the user interface 50 to obtain reports displayed on the interface that identify the number of inoperative inkjets and the printheads 204 in which the inoperative inkjets are located. The optical sensor can be a digital camera, an array of LEDs and photodetectors, or other devices configured to generate image data of a passing surface. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from a scanning system or an online or work station connection. The ink image content data is processed to generate the inkjet ejector firing signals delivered to the printheads 204 in the modules 34A-34D. Along with the ink image content data, the controller 80 receives print job parameters that may identify the media weight, media dimensions, print speed, media type, ink area coverage to be produced on each side of each next print sheet, location of the images to be produced on each side of each next print sheet, media color, media fiber orientation for fibrous media, print zone temperature and humidity, media moisture content, and media manufacturer. As used in this document, the term "print job parameters" means non-image content data for a print job and the term "ink image content data" means digital data that identifies a color and a volume of each ejected ink drop that forms pixels in an ink image to be printed on a media sheet.

Figure 3:
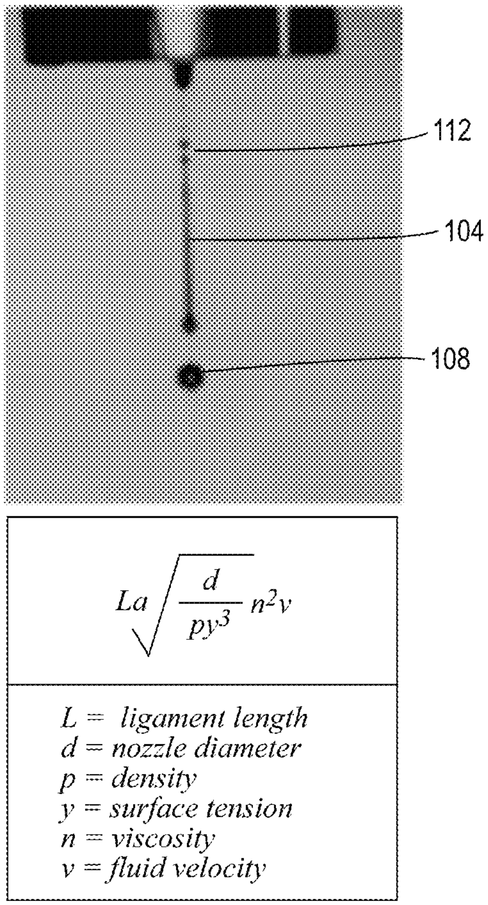
FIG. 3 illustrates a ligament of an ejected ink drop and the parameters that affect its length.
Figure 4:
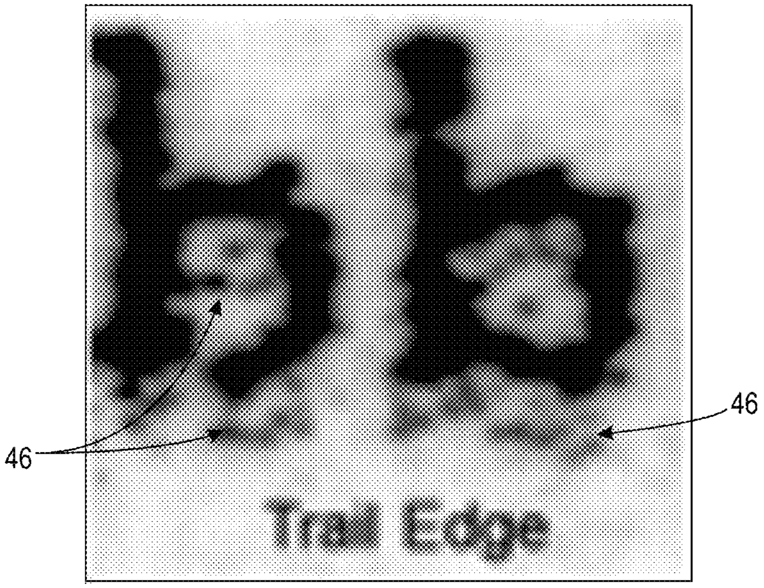
FIG. 4 illustrates the impact of ink drop satellites on the clarity of a pair of printed characters.

FIG. 3 shows an ejected ink drop shortly after ejection from an inkjet nozzle. An elongated portion of the ink drop, sometimes called a ligament 104, has separated from the lead spherical portion of the drop 108 and the trailing end of the drop 112. As shown by the formula in the figure, the length of this ink drop ligament 104 is proportional to the product of the nozzle diameter, the square of the ink viscosity, and the velocity of the ink divided by the product of the density and the cube of the surface tension. The longer the length of the ligament 104, the higher the probability that the ligament fractures and forms satellites. These satellites behave across the print gap differently than the larger well-formed drops before they land on the media. For example, their velocity loss is greater, their momentum is lower, and their susceptibility to airflows is higher among other factors compared to larger well-formed ink drops. These satellites 46 contribute to an image blur such as that shown in FIG. 4.

A drive waveform is a set of timed actuator wall movements that generate and propagate acoustic pressure waves within a channel. In inkjet 2D and 3D printing, the waveform graphically represents and controls the electrical signal sent to the inkjet nozzles inside the printhead, which causes the nozzle to fill and fire. The flexible nozzle chambers respond to the electrical signal, drawing in ink as the nozzle expands and then ejecting a drop as the nozzle contracts. The process repeats thousands of times per second. As with any wave, there is amplitude and frequency. In addition, there is a pulse width hold. The amplitude of the wave characterizes voltage pulse. This initiates the nozzle chamber actuator to pull ink into the chamber. The electrical pulse width holds at the apex for a specified period and then cycles off. At the nadir, another pause begins called pulse spacing.

Thus, the drive waveform has a critical role in the operation of the printhead with the ink to be jetted. The greater the voltage, the higher the speed of the droplets will be. The high voltage creates more pressure in the ink chamber. A higher voltage may increases the number of satellites. For faster printing speeds, a higher frequency is typically applied-within limits. The higher frequency sacrifices the pauses between cycles. Pulse spacing gives the ink time to stop moving like a wave in the chamber.

As noted above, drops from multiple ejection waveforms can have more satellites than drops from single (or fewer) ejection waveforms. Typically image quality drives towards using larger volume drops (higher number of ejections) in text and lines to make them more bold. This can cause issues with satellites 46 at the trailing edges of text and lines, as can be seen by example in FIG. 4.

While not being limited to a particular size, exemplary small drop volumes (e.g., less than about 100 picoliters (pL), less than about 4 pL, at most about 2 pL, 1-2 pL) have less volume than respectively large drop volumes (e.g., greater than 2 pL, greater than 4 pL, at least 8 pL, at least about 100 pL), with a boundary between small drops and large drops determined in accordance with several factors, including ink type, ink viscosity, media type, media sheet size, nozzles, ink jetting distance between nozzles and media sheets, and intended viewing distance between the media sheet and image scanner (e.g., human eye, camera, scanner) as understood by as understood by a skilled artisan. Moreover, additional sized drops, for example medium drops, may be considered in a determination and application of ink drops having better satellite performance than small drops, large drops and any combination thereof. Medium sized drops may have drop volume between small drop volumes and large drop volumes, with size boundaries between different sized drops determined for example as discussed above.

Figure 5:
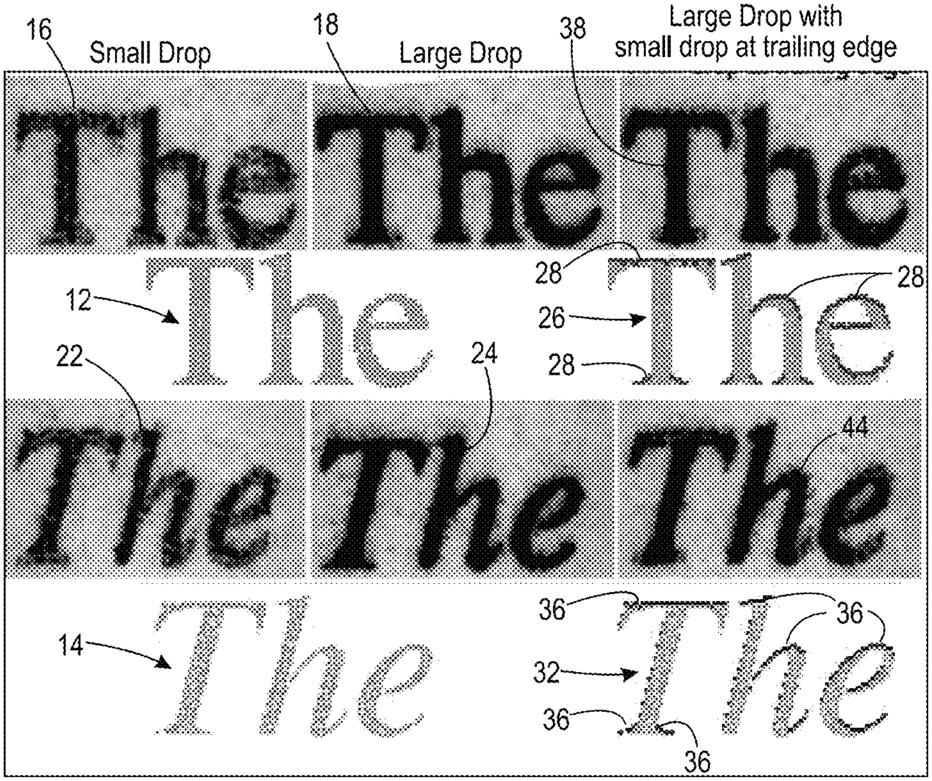
FIG. 5 depicts test ink image content data and exemplary ink jet pattern images printed with a printer as depicted in FIG. 1.

FIG. 5 depicts test ink image content data and exemplary ink jet pattern images printed with small drops, large drops, and a combination thereof with mostly large drops and small drops at the trailing edge of the test print images. In this example, the word "The" is the test ink image content data shown in normal font 12 and italic font 14. In comparing the small drop normal font printed image 16, and the large drop normal font printed image 18, the large drop printed image is fuller and bolder than the small drop printed image, and also has many more satellite drops outside the desired borders of the normal font test ink image content data 12 than the small drop printed image. These difference between small drop printed images and large drop printed images is confirmed via a comparison of small and large drop printed images of the italic font test ink image content date 14, where the small drop italic printed image 22 is not as full and bold as the large drop italic printed image 24, and also has many fewer satellite drops outside the desired borders of the italic font ink image content data than the large drop italic printed image.

Still referring to FIG. 5, normal font test ink image hybrid content data 26 replicates the normal font test ink image content data 12, and includes trailing edges 28 of the content data shown in a darker shade. Similarly, italic font test ink image hybrid content data 32 replicates the italic font test ink image content data 14, and includes trailing edges 36 of the content data shown in a darker shade. The leading edges and trailing edges of the image content data and ink image may be determined in accordance with the process direction of the media. For example, the ink image hybrid content data 26, 32 identify the media process direction as from the bottom of a sheet to the top of the sheet, with the leading edges represented by the edges of the image corresponding to the first drops of the inkjet for each image portion row or column, and the trailing edges represented by the edges of the image corresponding to the last drops of the inkjet for each image portion row or column. Accordingly, the trailing edges 28, 36 of the test ink image hybrid content data is shown as the upper vertical border of pixel columns for each imaged (e.g., to be printed) portion of the image.

In operation, the controller 80 analyzes the content data to identify ink image features in the ink image content data that are to be printed at the leading edge and the trailing edge of the ink image to be printed on a media sheet S. For example, the controller 80 identifies ink image features including the trailing edges, as indicated by the darker shaded trailing edges 28, 36. The controller 80 selects the inkjets, including the printhead modules and printheads thereof, for printing the ink image content data onto the media sheet S as understood by a skilled artisan. The controller 80 operates the selected inkjets to print portions of the ink image features at the leading edge and the trailing edge of the ink image that corresponds to the ink image hybrid content data with the trailing edges having smaller ink drops than the leading edge and central portions of the images.

As an example of an inkjet-printed image illustrated in FIG. 5, the normal font printed image 38 printed from the normal font test ink image hybrid content data 26 is both bold from the leading edges of the images through the central portion of the image letters. Yet the trailing edges of the printed image 38 are printed with smaller ink drops than the leading edge and central portions, and appear not quite as bold as the leading edge and central portions, and having fewer satellites outside the desired borders of the normal font test ink image hybrid content data 26 than corresponding trailing edges of the large drop normal font printed image 18. Likewise, the italic font printed image 44 printed from the italic font test ink image hybrid content data 32 is bold from the leading edges of the images through the central body of the image. Further, the trailing edges of the printed image 44 are printed with smaller ink drops and appear not quite as bold as the leading edge and central portions, and having fewer satellites outside the desired borders of the italic font test ink image hybrid content data 32 than corresponding trailing edges of the large drop italic font printed image 24.

While not being limited to a particular theory, the controller operates the inkjets via computer-executable/programmed instructions as understood by a skilled artisan for ejecting ink drops at the leading edges and trailing edges of ink images to be printed at different ejection output volumes, with the trailing edges having less ink ejection volume (e.g., by size, number of ejections, ejections per drop, number of drops, waveform frequency, waveform voltage) than the leading edges. In examples, the controller may modify the waveforms at the trailing edges by dropping the voltage of the waveform or lowering the waveform frequency to drive the selected inkjets to eject smaller or fewer ink drops with a lower ink volume at the trailing edges of the ink mages.

Figure 6:
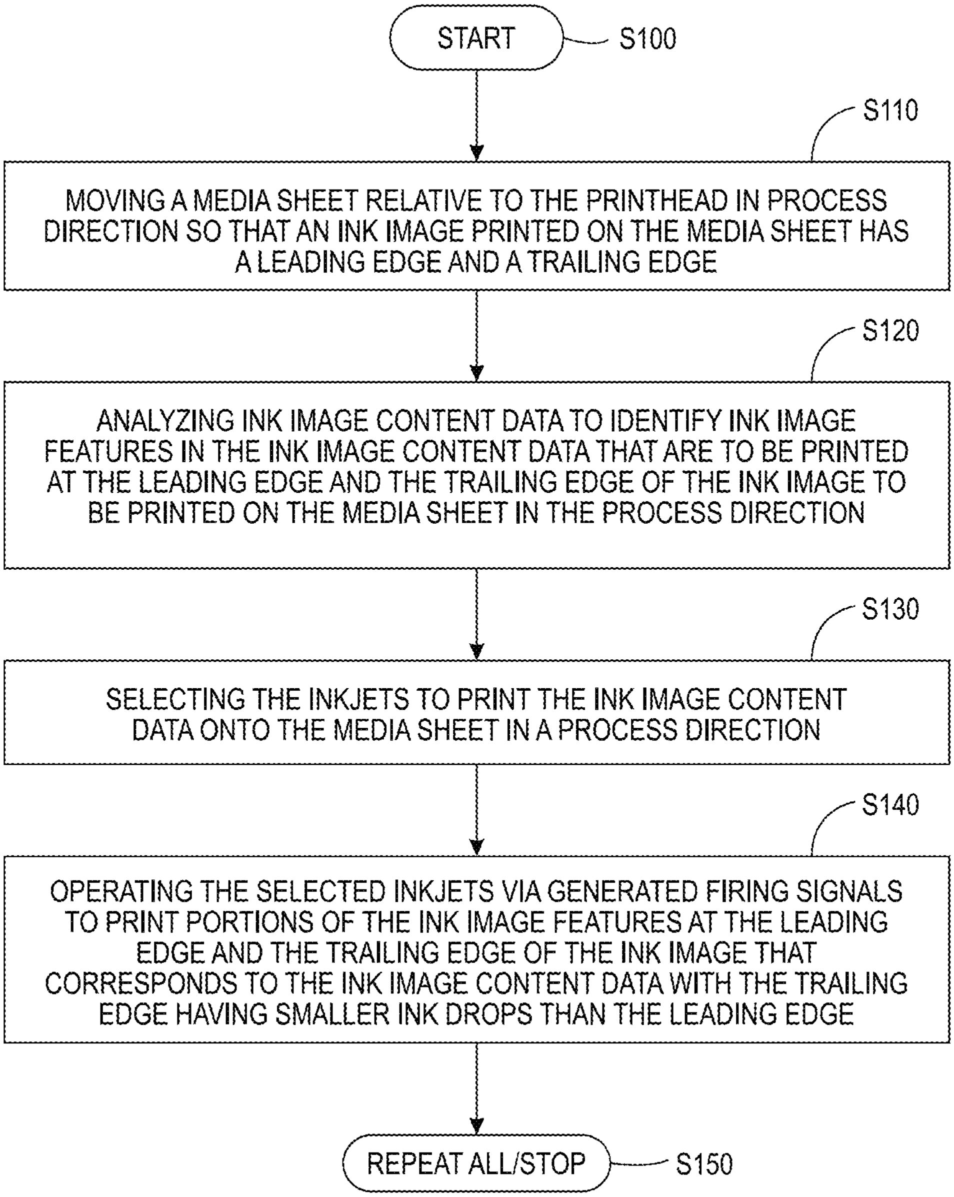
FIG. 6 is a flowchart depicting the operation of an exemplary printer in accordance with examples.

The disclosed embodiments may include an exemplary method for reducing satellites when printing from a printer using multi-ejection waveforms. FIG. 6 illustrates a flowchart of such an exemplary method. As shown in FIG. 6, operation of the method commences at Step S100 and proceeds to Step S110.

At Step S110, an inkjet printer having a printhead, a controller and a media transport moves a media sheet relative to the printhead in a process direction so that an ink image printed on the media sheet has a leading edge and trailing edge. Operation of the method proceeds to Step S120, where the controller analyzes ink image content data to identify ink image features in the ink image content data that are to be printed at the leading edge and the trailing edge of the ink image to be printed on the media sheet in the process direction. The leading edges and trailing edges of the ink image may be determined in accordance with the process direction of the media, with the leading edges represented by the edges of the image corresponding to the first drops of the inkjet for the image, and the trailing edges represented by the edges of the image corresponding to the last drops of the inkjet for the image.

At Step S130, the controller selects the inkjets to print the ink image content data onto the media sheet in the process direction. Operation proceeds to Step S140, where the controller operates the selected inkjets via generated firing signals to print portions of the ink image features at the leading edge and the trailing edge of the ink image that corresponds to the ink image content data with the trailing edge having smaller ink drops than the leading edge. In other words, the selected inkjets print the trailing edges having less ink ejection volume (e.g., by size, number of ejections, ejections per drop, number of drops, waveform frequency, waveform voltage) than the leading edges. Operation may proceed to Step S150 for ejection of the media sheet and/or termination of the operation, or may continue by repeating back to Steps S110 and S120 for continued printing.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 6, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Figure 7:
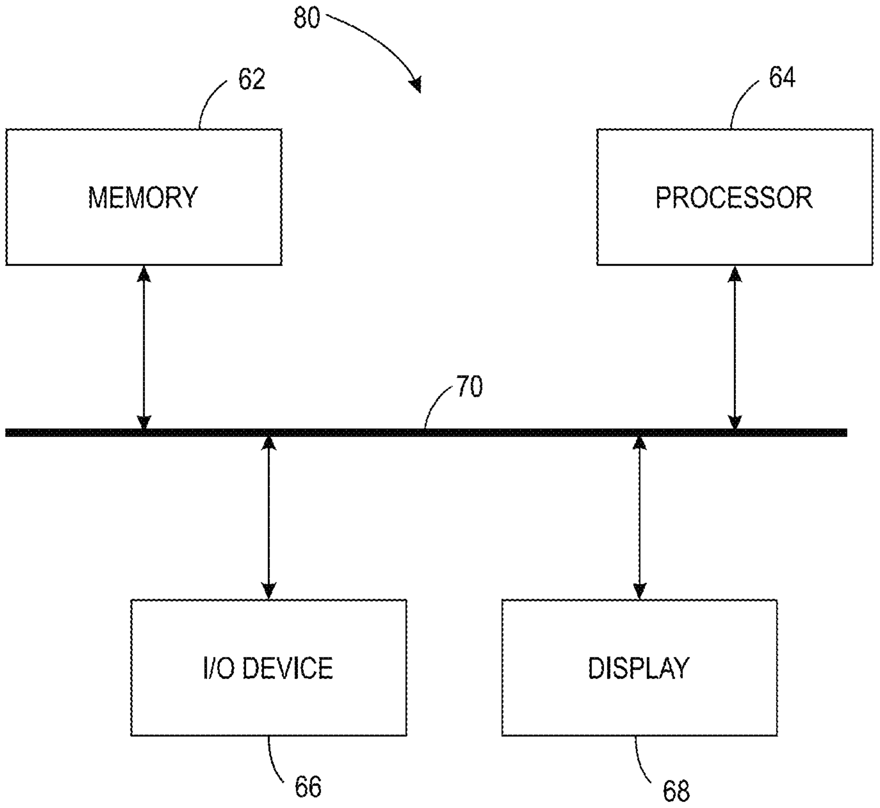
FIG. 7 is a block diagram of a controller with a processor for executing instructions to automatically control components and actions of the exemplary variable data inkjet printer depicted in FIG. 1.

FIG. 7 illustrates a block diagram of a controller 80 with a processor for executing instructions to automatically control devices, components thereof and actions in the printer illustrated in FIG. 1. The controller 80 is capable of receiving information and instructions from a workstation and from image input devices to coordinate the image formation on the print media 14 through various subsystems such as the flood coat delivery unit 22, the ink image applicator 28, the viscosity control unit 34, and the like. The print media S should not be considered to be limited to any particular composition such as, for example, paper, plastic, metal, or composite sheet film. The exemplary inkjet printer 10 may be used for producing images on a wide variety of image receiving print media.

The controller 80 may be embodied within devices such as a desktop computer, a laptop computer, a handheld computer, an embedded processor, a handheld communication device, or another type of computing device, or the like. The controller 80 may include a memory 62, a processor 64, input/output devices 66, a display 68 and a bus 70. The bus 70 may permit communication and transfer of signals among the components of the controller 80 or computing device.

Processor 64 may include at least one conventional processor or microprocessor that interprets and executes instructions. The processor 64 may be a general purpose processor or a special purpose integrated circuit, such as an ASIC, and may include more than one processor section. Additionally, the controller 80 may include a plurality of processors 64.

Memory 62 may be a random access memory (RAM) or another type of dynamic storage device that stores information and instructions for execution by processor 64. Memory 62 may also include a read-only memory (ROM) which may include a conventional ROM device or another type of static storage device that stores static information and instructions for processor 64. The memory 62 may be any memory device that stores data for use by controller 80.

Input/output devices 66 (I/O devices) may include one or more conventional input mechanisms that permit data between components of the variable data inkjet printing system 10 and for a user to input information to the controller 80, such as a microphone, touchpad, keypad, keyboard, mouse, pen, stylus, voice recognition device, buttons, and the like, and output mechanisms for generating commands, voltages to power actuators, motors, and the like or information to a user such as one or more conventional mechanisms that output information to the user, including a display, one or more speakers, a storage medium, such as a memory, magnetic or optical disk, disk drive, a printer device, and the like, and/or interfaces for the above. The display 68 may typically be a LED, LCD or CRT display as used on many conventional computing devices, or any other type of display device.

The I/O devices 66 may be a part or a function of a graphical user interface (GUI) mounted on, integral to, or associated with, the inkjet printer with which the controller 80 is associated. In addition, the I/O devices 66 may include one or more separate external communication interfaces by which the controller may communicate with components that may be external to the controller. At least one of the I/O device external communication interfaces may be configured as an input port to support connecting an external CAD/CAM device storing modeling information for execution of the control functions in the inkjet image forming operations. Any suitable data connection to provide wired or wireless communication between the controller 48 and I/O device external and/or associated components is contemplated to be encompassed by the depicted I/O devices 66.

The controller 80 may perform functions in response to processor 64 by executing sequences of instructions or instruction sets contained in a computer-readable medium with readable program code, such as, for example, memory 62. Such instructions may be read into memory 62 from another computer-readable medium, such as a storage device, or from a separate device via a communication interface, or may be downloaded from an external source such as the Internet. The controller 80 may be a stand-alone controller, such as a personal computer, or may be connected to a network such as an intranet, the Internet, and the like. Other elements may be included with the controller 80 as needed.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages like Perl or Python. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g. through the Internet using an Internet Service Provider).

The memory 62 may store instructions that may be executed by the processor to perform various functions. For example, the memory 62 may store instructions operative on the processor 64 for controlling the activity of the inkjet printing system 10, including operating the inkjets to print portions of the ink image features at the leading edge and the trailing edge of the ink image that corresponds to the ink image content data with the trailing edge having smaller ink drops than the leading edge. The memory 62 may also store instructions operative on the processor 64 for moving a media sheet relative to the printhead in a process direction via the media transport so that an ink image printed on the media sheet has a leading edge and trailing edge, analyzing ink image content data via the controller to identify ink image features in the ink image content data that are to be printed at the leading edge and the trailing edge of the ink image to be printed on the media sheet in the process direction, and selecting inkjets via the controller to print the ink image content data onto the media sheet in the process direction.

AM (or 3D printing) techniques often employ one or more processes that are adapted from, and appear in many respects to be similar to, well-known processes for forming two-dimensional (2D) printed images on image receiving media substrates. The significant differences in the output structures produced by the 3D printing techniques are generally based on (1) a composition of the deposited materials that are used to form the output 3D objects from the AM device/system or 3D printer; and (2) a number of passes made by the printing systems in depositing comparatively large numbers of successive layers of the deposition material to build up the body of material to the form of the output 3D objects. Certain AM techniques (e.g., 3D object layering and build techniques including 3D printing) deposit and cure liquid materials using technologies for the deposition of those liquid materials such as jetted (ink) material "printing" techniques.

While not being limited to a particular theory, the inkjet printer replaces drops that have or would have poor satellite performance with drops that have better satellite performance, regardless of drop size. In examples, the printer 10 replaces large drops, which have poor satellite performance (e.g., drop volume, multiple ejections, velocity) with fewer or smaller drops that have better satellite performance. It is understood that examples include inkjet printer that improve print quality specifically around trailing edge satellite performance by replacing drops that have poor satellite performance with drops that have better satellite performance, regardless of drop size (volume, # of ejections, voltage, frequency). For example, a greyscale mode may have more than two drop sizes. In other words, the printhead may have small, medium, and large volume drops. The printer, or controller thereof, may analyze ink image content data and determine that the large drops and the small drops have relatively poor satellite performance, and the medium drops have very good satellite performance. This analysis/determination may be aided with a measurement device (e.g., scanner, camera) configured to determine edge blurriness in accordance with, for example, ISO/IEC 24790. In such an example, blurriness may be determined using different sized drops for printing with ink drop quantities and sizes that reduce trailing edge blurriness and improve satellite performance. Accordingly, the printer may replace large, medium and small drops with drops having a different size (and/or quantity of drops) at the trailing edge based on the analysis to improve satellite performance.

Those skilled in the art will appreciate that other embodiments of the disclosed subject matter may be practiced with many types of printhead and nozzle elements common to inkjet printing systems in many different configurations. For example, the inkjet printer may be a 2D printer or a 3D printer and may print the ink image in at least one of a binary printing mode and a grayscale printing mode. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A method to reduce satellites when printing from a printer using multi-ejection waveforms, the printer including a printhead having a plurality of inkjets, a media transport and a controller, the method comprising the following steps:

a) moving a media sheet relative to the printhead in a process direction via the media transport so that an ink image printed on the media sheet has a leading edge and trailing edge;

b) analyzing ink image content data via the controller to identify ink image features in the ink image content data that are to be printed at the leading edge and the trailing edge of the ink image to be printed on the media sheet in the process direction;

c) selecting the inkjets via the controller to print the ink image content data onto the media sheet in the process direction; and d) operating the selected inkjets via the controller to print portions of the ink image features at the leading edge and the trailing edge of the ink image that corresponds to the ink image content data with the leading edge printed with ink drops having a first size, and the trailing edge printed with one of ink drops having a second size and fewer ink drops than the leading edge, wherein:

the selected inkjets are operated to emit drops with a first number of ejections at the leading edge of the ink image, and to emit drops with a second number of ejections less than the first number of ejections at the trailing edge of the ink image; or the selected inkjets are operated to print the ink image via the inkjets emitting multiple-ejection drops, with the inkjets emitting first volume drops via a first number of ejections per drop, and second volume drops via a second number of ejections per drop, the second number of ejections per drop being less than the first number of ejections per drop resulting in the second volume drops being smaller in volume than the first volume drops; or the selected inkjets are operated via a plurality of full length waveforms, a particular first waveform having a first voltage to drive the selected inkjets at the leading edge of the ink image, and a particular second waveform having a second voltage lower than the first voltage to drive the selected inkjets at the trailing edge of the ink image; or the selected inkjets are operated via a plurality of full length waveforms, a particular first waveform having a first waveform frequency to drive the selected inkjets at the leading edge of the ink image, and a particular second waveform having a second waveform frequency lower than the first waveform frequency of the particular first waveform to drive the selected inkjets at the trailing edge of the ink image; or an ejection waveform between the leading edge and the trailing edge of the ink image is modified so that the inkjets eject fewer drops of ink at the trailing edge than at the leading edge.

2. The method of claim 1, the step d) including operating the selected inkjets to emit the drops with the first number of ejections at the leading edge of the ink image, and to emit the drops with the second number of ejections less than the first number of ejections at the trailing edge of the ink image.

3. The method of claim 1, the step d) including operating the selected inkjets to print the ink image via the inkjets emitting multiple-ejection drops, with the inkjets emitting first volume drops via the first number of ejections per drop, and second volume drops via the second number of ejections per drop, the second number of ejections per drop being less than the first number of ejections per drop resulting in the second volume drops being smaller in volume than the first volume drops.

4. The method of claim 1, the step d) including operating the selected inkjets via the plurality of full length waveforms, the particular first waveform having the first voltage to drive the selected inkjets at the leading edge of the ink image, and the particular second waveform having the second voltage lower than the first voltage to drive the selected inkjets at the trailing edge of the ink image.

5. The method of claim 1, the step d) including operating the selected inkjets via the plurality of full length waveforms, the particular first waveform having the first waveform frequency to drive the selected inkjets at the leading edge of the ink image, and the particular second waveform having the second waveform frequency lower than the first waveform frequency of the particular first waveform to drive the selected inkjets at the trailing edge of the ink image.

6. The method of claim 1, further comprising printing the ink image in both a binary printing mode and a grayscale printing mode.

7. The method of claim 1, the step d) including modifying the ejection waveform between the leading edge and the trailing edge of the ink image so that the inkjets eject fewer drops of ink at the trailing edge than at the leading edge.

8. The method of claim 1, wherein one of the second size ink drops are smaller than the first size ink drops, and the printer is a 3D printer.

9. A printer comprising:

a printhead having a plurality of inkjets;

a media transport for moving a media sheet relative to the printhead in a process direction so that an ink image printed on the media sheet has a leading edge and trailing edge; and a controller operatively connected to the printhead, the controller being configured to:

analyze ink image content data to identify ink image features in the ink image content data that are to be printed at the leading edge and the trailing edge of the ink image to be printed on the media sheet in the process direction;

select the inkjets to print the ink image content data onto the media sheet in the process direction; and operate the selected inkjets to print portions of the ink image features at the leading edge and the trailing edge of the ink image that corresponds to the ink image content data with the leading edge printed with ink drops having a first size, and the trailing edge printed with one of ink drops having a second size and fewer ink drops than the leading edge, wherein the controller is configured to:

operate the selected inkjets to emit drops with a first number of ejections at the leading edge of the ink image, and to emit drops with a second number of ejections less than the first number of ejections at the trailing edge of the ink image; or operate the selected inkjets to print the ink image via the inkjets emitting multiple-ejection drops, with the inkjets emitting first volume drops via a first number of ejections per drop, and second volume drops via a second number of ejections per drop, the second number of ejections per drop being less than the first number of ejections per drop resulting in the second volume drops being smaller in volume than the first volume drops; or operate the selected inkjets from a plurality of full length waveforms, a particular first waveform having a first voltage to drive the selected inkjets at the leading edge of the ink image, and a particular second waveform having a second voltage lower than the first voltage to drive the selected inkjets at the trailing edge of the ink image; or operate the selected inkjets from a plurality of full length waveforms, a particular first waveform having a first waveform frequency to drive the selected inkjets at the leading edge of the ink image, and a particular second waveform having a second waveform frequency lower than the first waveform frequency of the particular first waveform to drive the selected inkjets at the trailing edge of the ink image.

10. The printer of claim 9, the controller configured to operate the selected inkjets to emit drops with the first number of ejections at the leading edge of the ink image, and to emit drops with the second number of ejections less than the first number of ejections at the trailing edge of the ink image.

11. The printer of claim 9, the controller configured to operate the selected inkjets to print the ink image via the inkjets emitting multiple-ejection drops, with the inkjets emitting first volume drops via the first number of ejections per drop, and second volume drops via the second number of ejections per drop, the second number of ejections per drop being less than the first number of ejections per drop resulting in the second volume drops being smaller in volume than the first volume drops.

12. The printer of claim 9, the controller configured to operate the selected inkjets from the plurality of full length waveforms, the particular first waveform having the first voltage to drive the selected inkjets at the leading edge of the ink image, and the particular second waveform having the second voltage lower than the first voltage to drive the selected inkjets at the trailing edge of the ink image.

13. The printer of claim 9, the controller configured to operate the selected inkjets from the plurality of full length waveforms, the particular first waveform having the first waveform frequency to drive the selected inkjets at the leading edge of the ink image, and the particular second waveform having the second waveform frequency lower than the first waveform frequency of the particular first waveform to drive the selected inkjets at the trailing edge of the ink image.

14. The printer of claim 9, the controller configured to operate the selected inkjets to print the ink image in both a binary printing mode and a grayscale printing mode.

15. The printer of claim 9, the controller configured to operate the selected inkjets to print the ink image including modifying an ejection waveform between the leading edge and the trailing edge of the ink image so that the inkjets eject fewer drops of ink at the trailing edge than at the leading edge.

16. The printer of claim 9, wherein one of the second size ink drops are smaller than the first size ink drops, and the printer is a 3D printer.

17. A non-transitory computer readable medium storing instructions that, when executed by a processor, cause the processor to execute the steps of a method to reduce satellites when printing from a printer using multi-ejection waveforms, the printer including a printhead having a plurality of inkjets, a media transport and a controller, the method comprising:

a) moving a media sheet relative to the printhead in a process direction via the media transport so that an ink image printed on the media sheet has a leading edge and trailing edge;

b) analyzing ink image content data via the controller to identify ink image features in the ink image content data that are to be printed at the leading edge and the trailing edge of the ink image to be printed on the media sheet in the process direction;

c) selecting the inkjets via the controller to print the ink image content data onto the media sheet in the process direction; and d) operating the selected inkjets via the controller to print portions of the ink image features at the leading edge and the trailing edge of the ink image that corresponds to the ink image content data with the leading edge printed with ink drops having a first size, and the trailing edge printed with one of ink drops having a second size and fewer ink drops than the leading edge, wherein:

the selected inkjets are operated to emit drops with a first number of ejections at the leading edge of the ink image, and to emit drops with a second number of ejections less than the first number of ejections at the trailing edge of the ink image; or an ejection waveform between the leading edge and the trailing edge of the ink image is modified so that the inkjets eject fewer drops of ink at the trailing edge than at the leading edge.

18. The non-transitory computer readable medium of claim 17, the step d) including operating the selected inkjets to emit the drops with the first number of ejections at the leading edge of the ink image, and to emit the drops with the second number of ejections less than the first number of ejections at the trailing edge of the ink image.

19. The non-transitory computer readable medium of claim 17 storing the instructions that, when executed by the processor, cause the processor to execute the further step of printing the ink image in both a binary printing mode and a grayscale printing mode.

20. The non-transitory computer readable medium of claim 17, the step d) including modifying the ejection waveform between the leading edge and the trailing edge of the ink image so that the inkjets eject fewer drops of ink at the trailing edge than at the leading edge.

* * * * *